(12) United States Patent
Newman et al.

(10) Patent No.: US 6,766,181 B1
(45) Date of Patent: Jul. 20, 2004

(54) FOLDING MOBILE STATION WITH DUAL-MOVEMENT HINGE

(75) Inventors: Rhys Newman, Woodland Hills, CA (US); Nikolaj Bestle, Calabasas, CA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/233,372

(22) Filed: Aug. 30, 2002

(51) Int. Cl.[7] .............................................. H04M 1/00
(52) U.S. Cl. ............................... 455/575.3; 455/575.4; 16/341; 379/433.13
(58) Field of Search ........................... 455/90.1–90.3, 455/575.1, 575.3, 575.4; 379/433.12, 433.13; 16/303, 329, 330, 341, 342; 439/10, 31

(56) References Cited

U.S. PATENT DOCUMENTS 6,149,442 A * 11/2000 Enright ........................ 739/31
6,175,990 B1 * 1/2001 Kato et al. ..................... 16/334

* cited by examiner

Primary Examiner—Lee Nguyen

(57) ABSTRACT

A folding mobile telephone having a dual-movement hinge. The hinge movably attaches one section of the mobile phone to another in such a way that there are at least two ways to access the various features of the mobile phone that are hidden from view in a closed position. The hinge includes a longitudinal pin having a first end that is disposed within a sleeve attached to the first enclosure section, and a second end that is disposed within a sleeve that is attached to the second enclosure section. As a result, the sections may be moved longitudinally with respect to each other for a portion of their length by sliding one or both sleeves away from the other along the pin. The sections may also be rotated about the pin to move the mobile telephone to an open position. In this way a user may selectively access all, or only a portion of the encloseable components and features of the mobile telephone.

19 Claims, 4 Drawing Sheets

FOLDING MOBILE STATION WITH DUAL-MOVEMENT HINGE

The present invention relates generally to mobile telephone design, and more specifically to a folding mobile station having a dual-movement hinge that permits convenient access to various mobile phone features and portions of the display.

BACKGROUND OF THE INVENTION

Mobile telephones are becoming more and more popular; in part this is due to their very nature. That is, they are not tied to a particular location, as is the case with most wireline telephones that are interconnected through the public switched telephone network (PSTN). In contrast, a mobile telephone is a wireless radio communication device that can be used to contact any one of many base stations that are distributed throughout a large geographic area, often called the network coverage area. The base stations are themselves connected to various switches so that call may be routed from one network subscriber to another, and to gateways so that network subscribers may send and receive calls with members of other networks as well. Perhaps a more significant reason for the current rise in mobile-telephone use is that rapid advances in technology have made them easier to use and more reliable. Some of these advances have occurred in the network, where connections are clearer and dropped less frequently than was the case when public land mobile networks (PLMNs) were in their infancy.

Many changes, however, have affected the mobile telephones themselves. Increasingly smaller, more efficient electrical components have permitted a drastic reduction in size. Only a short time ago, mobile telephones were relatively bulky, and were powered either by the battery of the automobile in which they were permanently installed, or by large 'portable' batteries that had to be carried around in a duffle bag. Today mobile phones are smaller than the hand of a typical user, including a battery that is capable of powering normal operation for hours, even days without a recharge. The efficiency of these instruments has increased so dramatically that not only are they smaller in size than their predecessors, they are also capable of performing far more functions. Some of these functions are relating directly to making and receiving calls, such as displaying the number dialed or the number of an incoming call, displaying received signal strength and communication mode (for example, analog or digital), and having adjustable alarms and ring tones. Other features are indirectly related, such as maintaining a telephone directory of numbers from which to select a party to call—even permitting the selection to be made by voice command. Some features and functions of modern mobile phones are not related to calling at all, such a calendaring and organizing or game playing. Some mobile phones even function as small personal computers, complete with the ability to download and display Web pages once a connection to the Internet has been established. These feature-rich mobile phones are provided with relatively large displays, typically liquid-crystal displays. They very often also require keypads more advanced than a traditional telephone having only a standard twelve-key set.

Mobile phone 100, for example, is a typical radio telecommunication device for use in a cellular communication network. It contains a radio transmitter and receiver (not shown) for sending transmissions to nearby base stations that are in turn connected with the main network. The network itself naturally provides for intra-network communication, and also includes gateways through which other networks, such as the public-switched telephone network (PSTN) and the Internet may be accessed. Mobile station 100 is most often used for real-time voice communication, but can be used for short-message-system (SMS) messaging, data transmission, Web surfing, and paging services as well.

The internal circuitry and components (not shown) of mobile phone 100 are contained in a casing, or enclosure, that typically includes two or more sections, which will sometimes herein be referred to as covers. Referring to FIG. 1, mobile phone 100 has an enclosure 101 that includes front cover 120 and back cover 122, which are removably fastened together at joint 105 when the phone is assembled. Front cover 120 and back cover 122 are not normally taken apart except for maintenance by a service technician. Front cover 120 and back cover 122 are normally made of a hard plastic material, such as polycarbonate/ABS (PC/ABS). This material is strong enough to protect the telephone internals from reasonable shock encountered in ordinary operation and to resist penetration by objects that it may encounter when placed in a user's pocket, purse, or briefcase.

Several openings are formed in enclosure 101 of mobile phone 100, with most, though not necessarily all of them present in front cover 120. The keypad 110 on face 106 of front cover 120 is a user interface including a plurality of openings, through which protrude keys such as alphanumeric keys 112, call control keys 114, scroll key 115 and function keys 116. As their names imply, these keys perform various duties in the phone's operation, with the alphanumeric keys 112 having a standard telephone keypad role, and the function and scroll keys used in connection with display 134. That is, the function of the function and scroll keys are variable and determined by the application state that the mobile phone is in, which is translated into a word or icon displayed next to the key on display 134.

Display 134 is typically a liquid crystal display (LCD) device. The LCD itself is protected by a plastic window pane 132, which is mounted to cover the display and protrude into window 130, an opening formed in front cover 120. As illustrated in FIG. 1, display 134 presents to the user such information as current function-key functions, telephone numbers, signal strength, and other information useful to the operation being performed. The protective window pane 132 is typically a component separate from the LCD, its chassis, and other portions of the internal assembly. Window pane 132 is necessary because the components making up the LCD are fragile and subject to damage from even mild strikes. Also formed in face 106 of front cover 120 is a small opening for power switch 118 and a plurality of small openings 142 that serve as a port for the speaker (not shown), which is mounted beneath them. At the opposite end of mobile station 100, microphone port 144 likewise permits entry of sound directed at the actual microphone (not shown) mounted inside.

Located in the end 107 of enclosure 101 are power port 146 for plugging in an external power adaptor and headphone port 145 for connecting an external headset and perhaps a microphone for hands-free operation. Power port 146 and headphone port 145 are receptacles for connecting (plugging in) an external appliance to the internal circuitry of mobile station 100. These receptacles are mounted within the mobile station's internal assembly (not shown) and are accessible from the outside through openings formed in end 107 of enclosure 101. When not using externally supplied power; the mobile station receives power from battery 124, which is removably attached to back cover 122.

The mobile phone 100 of FIG. 1 is just one current design. One available alternative (not shown) modifies the design of mobile phone 100 to add a protective cover attached to phone by a hinge in such a way that it may be rotated into a closed position covering the keys, or covering the display, or both. The cover may extend from the bottom of the phone and include a microphone so that when the cover is open the microphone is advantageously positioned.

In another currently available alternative design, the mobile-phone enclosure is divided into two sections connected electrically and mechanically with a hinge. Often, one section will contain the LCD and the other a keypad, both features being accessible when the phone is open, but not when it is folded shut. Such a phone is illustrated in FIGS. 2A and 2B, which are isometric views of a typical folding mobile phone shown in its open and closed configurations, respectively. Referring to FIG. 2A, mobile phone 200 has a first section 210 and a second section 250, the two sections being connected by a hinge 275. First section 210 includes an LCD 217, which is visible when the phone is open through a clear protective window pane 215. In FIG. 2A, speaker port 220 is visible just above the LCD 217.

Second section 250 includes the keypad 260, made up in this example of alphanumeric keys, call control keys, and a scroll key. Microphone port 255 is formed in the end of second section 250 that is opposite, when the phone is in an open configuration, to the end of first section 210 forming speaker port 220. The two sections are rotateably held together by hinge 275. Hinge 275 is made up of hinge sleeves 276 and 277 extending from first section 210, which interlock with hinge sleeves 278 and 279 extending from second section 250. The hinge sleeves collectively form an axial opening through which extends hinge pin 280.

The first section 210 and second section 250 rotate toward each other about hinge pin 280 until they meet, as shown in FIG. 2B. When in the closed configuration of FIG. 2B, power supply port 240 and external headphone port 245 remain accessible, but the LCD 210 and keypad 260 are protected. The folded phone may therefore safely be placed in a pocket, purse, or holder, but its keys and display are largely unusable when it is in this configuration. In contrast, the keys and display of mobile phone 100 shown in FIG. 1 are always accessible, but more prone to certain types of damage. Needed is a mobile station that both provides convenient feature accessibility and reduces the risk of damage. The present invention provides just such a device.

SUMMARY OF THE INVENTION

The present invention is directed to a mobile station having a dual movement hinge. The mobile station includes two enclosure sections, each housing certain of the mobile station's internal components. The mobile station has a display that is hidden when the mobile station is folded into the protective, or closed position by rotating the enclosure sections with respect to each other about the hinge. The hinge includes at least two sleeves that each form an opening for receiving a hinge pin, each sleeve being attached to or formed with one or the other enclosure section. The hinge is operable not only to permit rotation of the two sections, but to permit them to slide longitudinally, that is, along the hinge pin, into a limited-open configuration where the user is able to view a portion of the display. The invention may also include a stop mechanism to prevent excessive longitudinal movement and a spring to longitudinally bias the two enclosure sections relative to each other.

BRIEF DESCRIPTION OF THE DRAWINGS

For a more complete understanding of the present invention, and the advantages thereof, reference is made to the following drawings in the detailed description below.

DETAILED DESCRIPTION

Figure 1:
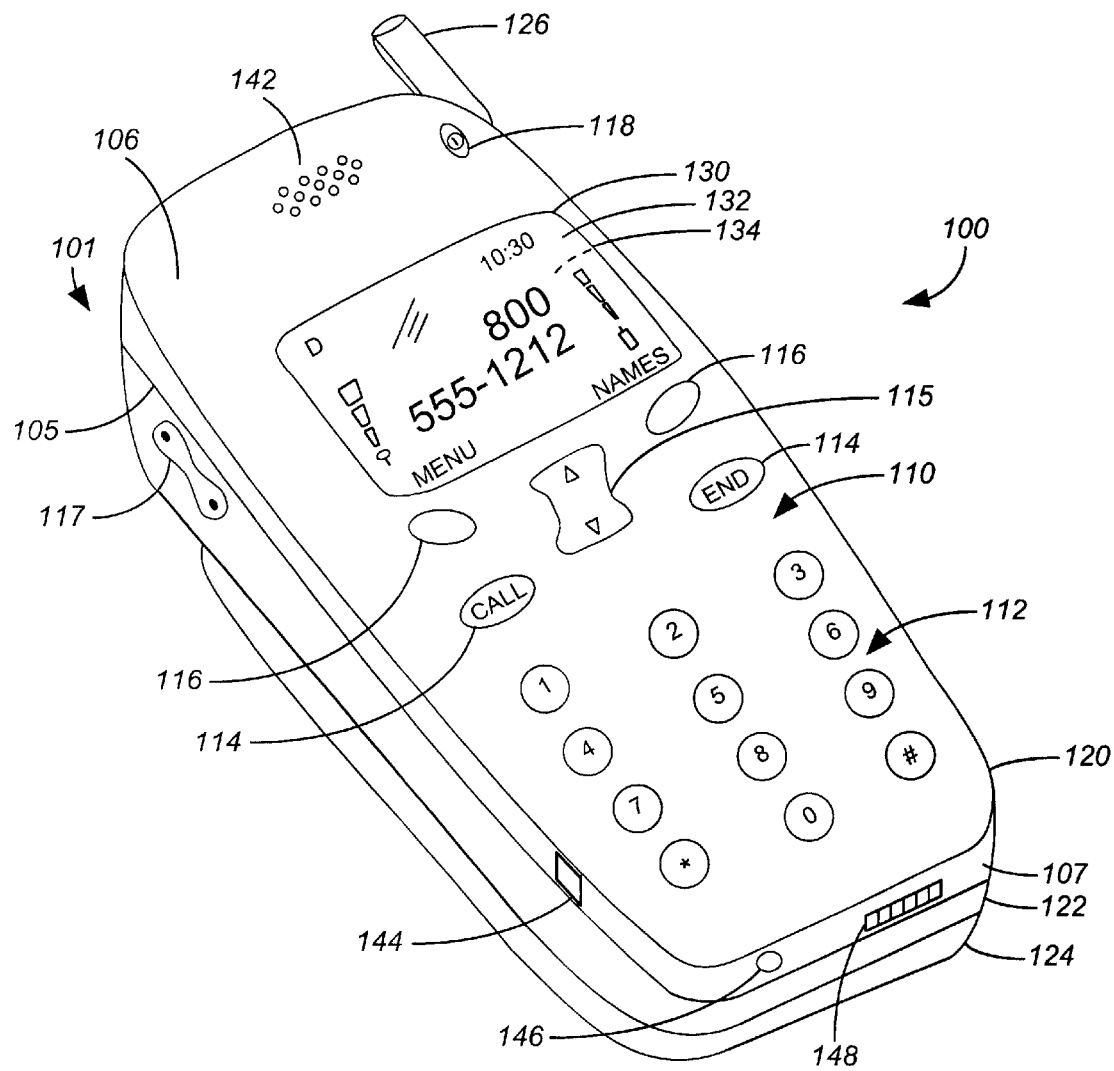
FIG. 1 is an isometric illustration of a typical mobile phone according to the prior art.
Figure 2A:
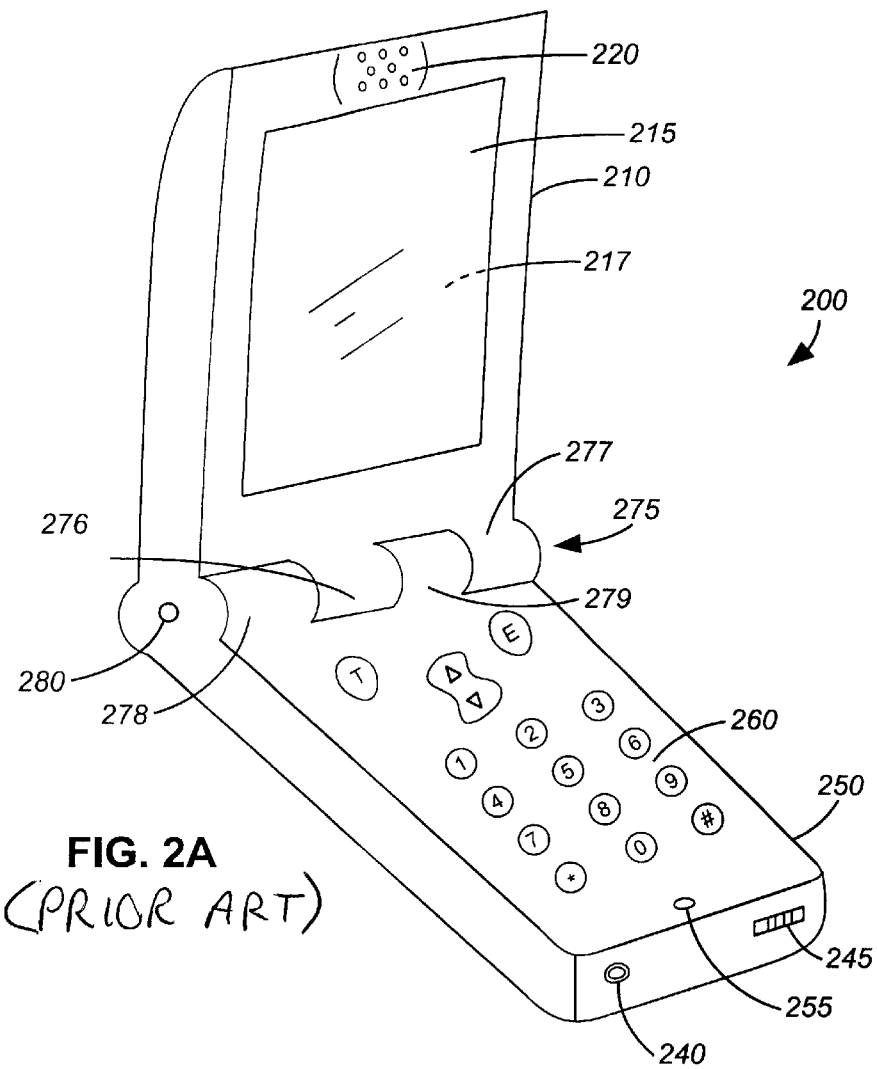
FIG. 2 is an isometric illustration of a typical folding mobile phone according to the prior art.
Figure 2B:
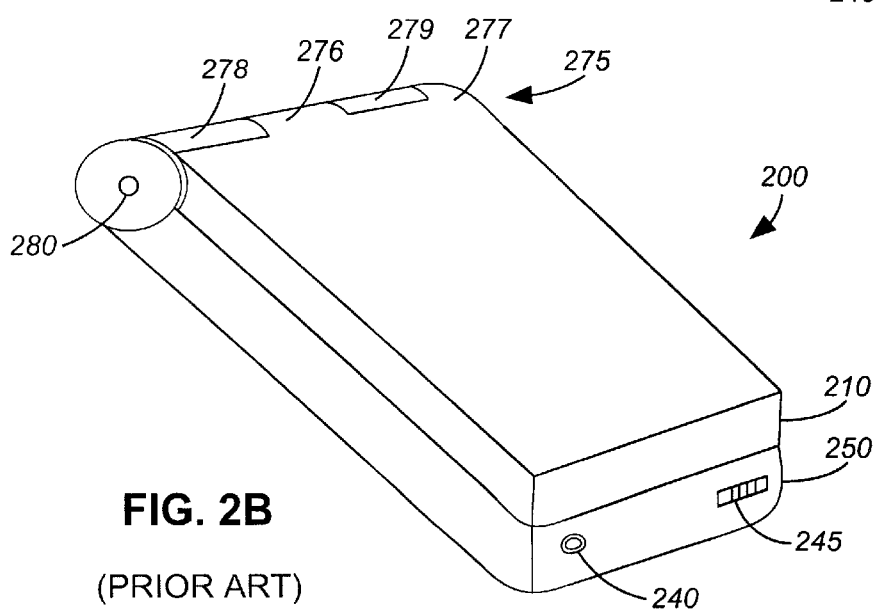
Figure 3A:
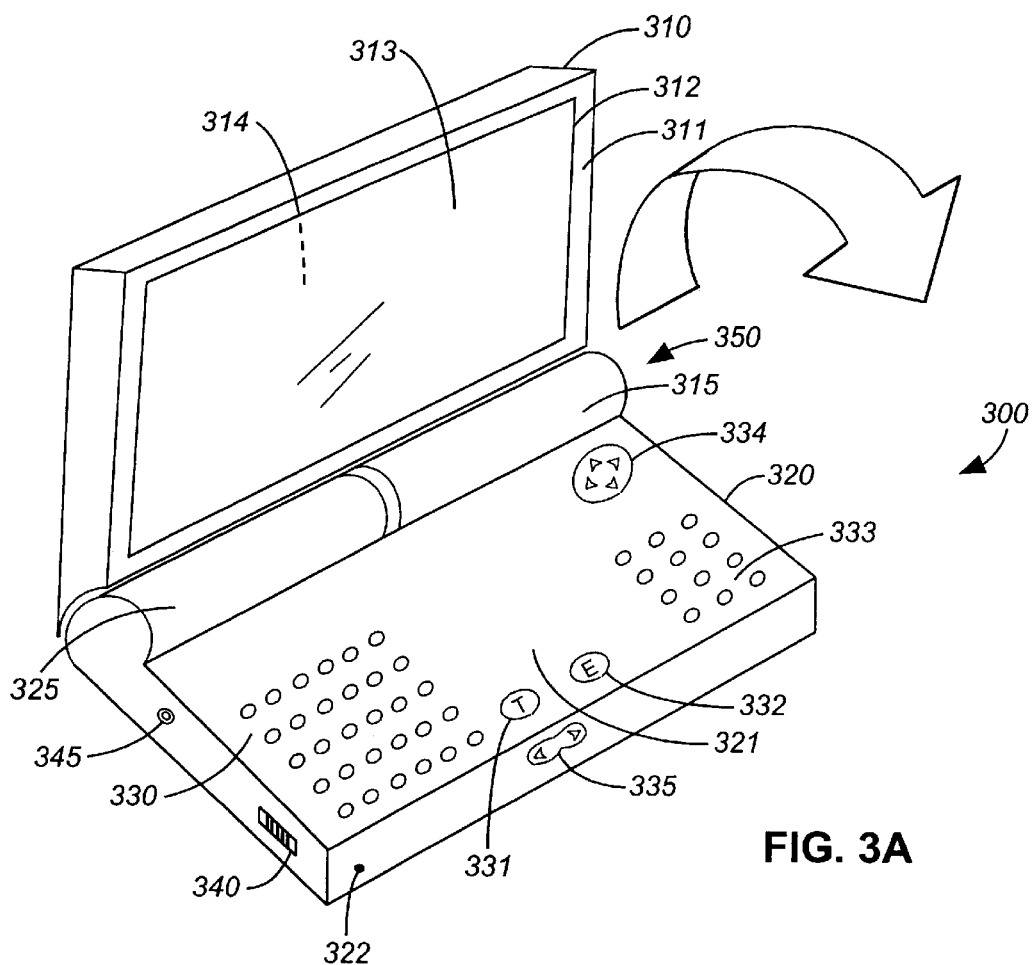
FIG. 3A is a isometric illustration of a mobile station according to an embodiment of the present invention, shown in the open configuration.
Figure 3B:
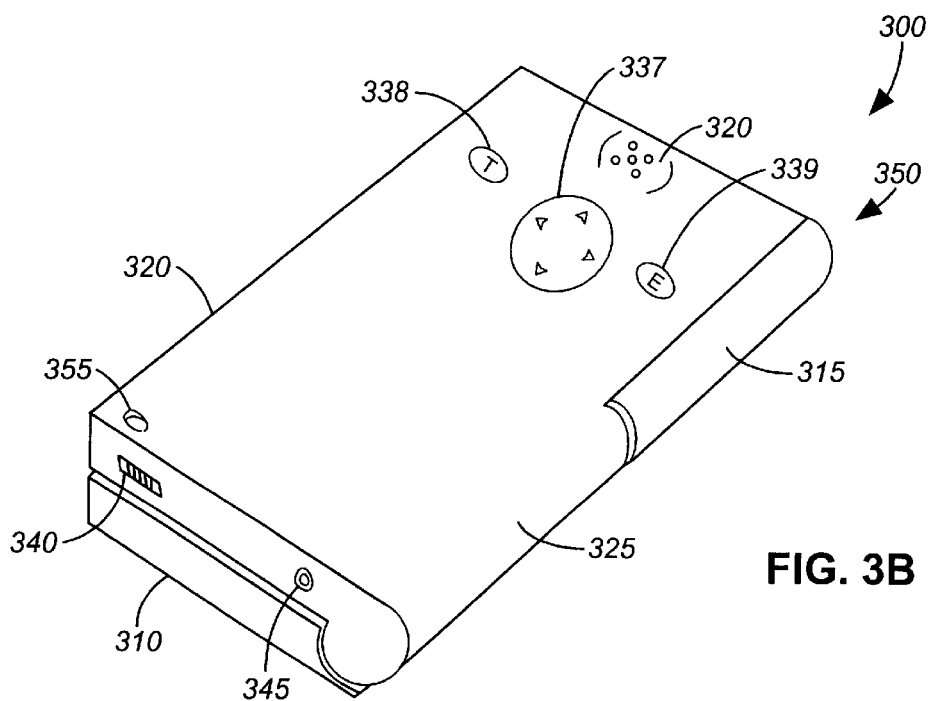
FIG. 3B is a isometric illustration of the mobile station of FIG. 3A, shown in the closed configuration.
Figure 3C:
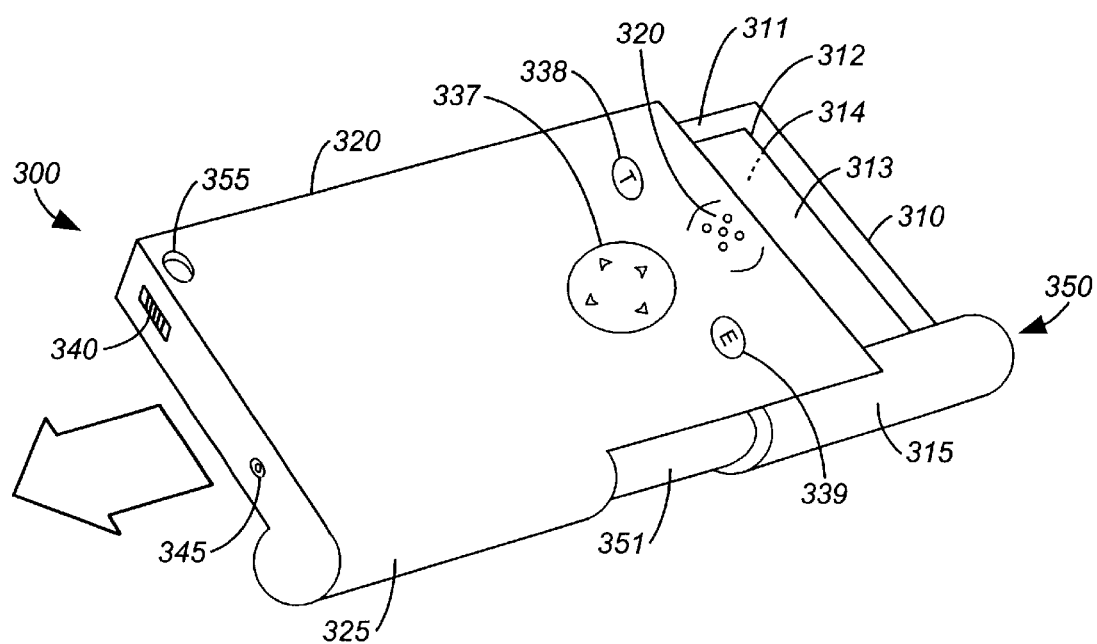
FIG. 3C is an isometric illustration of the mobile station of FIG. 3A, shown in the limited-open configuration.

FIGS. 3A through 3C, discussed below, and the various embodiments used to describe the present invention are by way of illustration only, and should not be construed to limit the scope of the invention. Those skilled in the art will understand the principles of the present invention may be implemented in any suitable mobile station, in addition to the devices specifically discussed herein.

The preferred embodiment of the present invention is an assembly for enclosing a mobile telephone, such as a cell phone. It is equally suitable, however, for other similar devices such as personal digital assistants (PDAs), Web-enabled phones, and the like. In fact, each of these devices—once sold for a limited purpose implied in their name—has acquired more and more common features so as to blur any distinction. For convenience, these and like devices will herein be referred to generically as "mobile stations". Note that a mobile station may have some or all of the features listed above, but no such feature is a requirement of the invention unless explicitly claimed to be so.

Whatever features are present in the mobile station, their accessibility will be enhanced by the limited-open feature of the present invention. FIGS. 3A through 3C illustrate a mobile station according to one embodiment of this invention. FIG. 3A is an isometric illustration of a mobile station 300 according to an embodiment of the present invention, shown in its open configuration. As can be seen in FIG. 3A, the open configuration need not be "fully open", but rather opened enough to provide the user with substantially complete access to all of the features and controls of mobile station 300. Mobile station 300 is a folding mobile station including two enclosure sections, a first enclosure section 310 and a second enclosure section 320. First enclosure section 310 has a face 311, which is visible when mobile station 300 is in the open configuration. Face 311 includes an opening 312 through which is visible a display 314, which is in all likelihood a liquid-crystal display (LCD) 314. As with traditional mobile stations, clear plastic cover 313 protects the sensitive LCD 314 from damage. Naturally, also protecting the LCD 314 from damage is the ability of the mobile station to fold into a closed position (shown in FIG. 3B).

The second enclosure section 320 of mobile station 300 also has a face 321 that forms a plurality of openings through which the control buttons of the keypad protrude. In the embodiment of FIG. 3A there is a numeric keypad 333, an alpha keypad 330, call control keys 331 and 332, and a pointing device key 334. In addition, a scroll key 335 is present on the outside wall 322 of second enclosure section 320. Naturally, most of the keypad is inaccessible when the mobile station 300 is folded into its closed configuration. Scroll key 335 is in this embodiment left exposed, and may serve a function useful when the mobile station is in the closed configuration. Although, the LCD 314 and the keypad are not accessible, the mobile station may nevertheless be used as a communications device. For this purpose, an external microphone and speaker (not shown) may be connected through external-device port 340. Nearby power port 345 enables the mobile station 300 to be connected to an external power source.

The mobile station 300 is adjustable between an open configuration and a closed one by rotating the two enclosure sections relative to each other about the hinge 350. In this embodiment, hinge 350 includes a first hinge sleeve 315, which is integrally formed with first enclosure portion 310. A second hinge sleeve 325, is likewise integrally formed with second enclosure section 320. Although the hinge sleeves must in some way be connected to their respective enclosure portions, they alternately may be a separate component attached with an adhesive or mechanical fastener. While the hinge sleeves 315 and 325 are shown in FIGS. 3A–3C to be substantially identical, this is not a requirement. There may be more than two hinge sleeves. Each sleeve forms a cylindrically-shaped hollow for receiving a hinge pin (not shown in FIG. 3A). In an embodiment, shown in FIGS. 3A–3C, the sleeve will be open-ended on the side nearest to the center of the mobile station and closed on the outsides. If there are more than two hinge sleeves, interior sleeves may have to form a longitudinal, cylindrical hollow that is not closed on one end, so that the hinge pin may extend through the opening. The mobile station is preferably constructed so that it may be operated between the open configuration of FIG. 3A, and the closed configuration of FIG. 3B where LCD 314 and the keypad are hidden from exterior view. The construction of the mobile station 300; however, will preferably not permit the opening movement to rotate the sections beyond a specified angle of rotation, typically one where the visible LCD 314 and keypad are substantially parallel with respect to each other.

FIG. 3B is an isometric illustration of the mobile station 300 of FIG. 3A, this time shown in the closed configuration. In this view, hinge 350 is visible in the foreground, meaning that scroll key 335 is hidden from view. As with a conventional folding mobile phone, in the closed configuration the LCD 314 is hidden from view but better protected against damage. The keys are inaccessible as well, except for scroll key 335. In this embodiment, however, an external pointing device key 337 and call control keys 338 and 339 have also been provided to extend the user's ability to operate the mobile station when it is in the closed, and more particularly when it is in the "limited-open" configuration. In accordance with the present invention, mobile station 300 is operable to transform between the closed configuration shown in FIG. 3B and a "limited-open" configuration, as illustrated in FIG. 3C.

FIG. 3C is an isometric illustration of the mobile station 300 of FIG. 3A, shown in the limited-open configuration. In this view, hinge pin 351 is visible because the first enclosure section 310 has been longitudinally moved with respect to the second enclosure section 320, separating hinge sleeve 315 from hinge sleeve 325. The hinge pin 351 is, in this embodiment, free to move relative to at least one of the hinge sleeves—at least within a limited range. When in the limited-open configuration, as illustrated in FIG. 3C, at least a portion of face 311 of first enclosure section 310 becomes visible from the exterior, and in particular exposing a portion of LCD 314. Although, full visual access to LCD 314 is not provided in this configuration, the amount of the display that is visible may be advantageously employed to display certain information related to a current function of the mobile station 300.

For example, some mobile stations have the ability to identify the telephone number or name of a party from which another call is being received, a feature commonly referred to as "caller-ID". When the user of a mobile station 300 receives a call, that is the mobile station is ringing, they may quickly manipulate the mobile station 300 to a limited-open configuration and, assuming the LCD 314 is properly driven, see the phone of the person that is trying to reach them. If desired, the user may then proceed with returning the mobile station to its closed configuration, accepting the telephone call, and engaging in the conversation. External call control keys 338 and 339 may be used for this purpose. Similarly, calls may be placed from mobile station 300 by operating it to a limited-open position and scrolling through a directory displayed on the visible portion of LCD 314. Since it is designed to be used for voice calls while in the closed configurations, mobile station 300 features speaker port 320 and microphone port 355, in this embodiment both formed on the exterior of second enclosure portion 320. Other features may be usefully accessed in like fashion. For examples, the user could check to see if the mobile station's ring tone has been turned off before entering a meeting, or simply check the time and date. An alarm might alert the user of an impending appointment, the nature of which can be ascertained by using the limited-open feature.

As should be apparent, several control features are either accessible in any configuration, such as scroll key 335, or available through different keys located both in- and out-side of the closed mobile station 300. While this is not a requirement, it is desirable so as to take full advantage of the present invention. Correspondingly, there is no indication that the inside and outside keys perform exactly the same function. To prevent accidental activation of the exterior keys, some safeguard may be put into place, perhaps by making the call control keys 338 and 339 inactive unless the scroll key 335 is also activated. In one embodiment of the present invention, the call control key 338 may be used to initiate or answer a call only when the mobile station 300 is in the limited-open configuration (shown in FIG. 3C).

The limited-open configuration may reveal as much of display 314 as is desirable in accordance with the circumstances of the mobile station's expected use, and other design considerations. Of course, there is little need to reveal substantially all of the LCD 314, since that view is available in the open configuration, although there is no requirement that any particular limit be imposed. As should be apparent, it may be necessary reconfigure the display graphics normally shown on LCD 314 in order to accommodate usefully the limited-open configuration. Referring back to FIG. 3A, for example, in this configuration a graphic display might most advantageously be presented with the bottom of the display located nearest the hinge, in order to be convenient to the user. Without modification, this will mean that in the limited-open configuration of FIG. 3C, only the right-hand side of the graphics presentation would be visible. Instead, the right-hand portion of the display (as viewed in the open configuration of FIG. 3A) may be reserved for a display meant to be viewed in this limited field of vision, and perhaps rotated accordingly. In one embodiment, the display is always in this configuration. In another, the user may manually select between a full screen display, and one that is split to allow viewing in both configurations. In a particularly preferred embodiment, the mobile station 300 is able to detect when the mobile station is in the open configuration (see FIG. 3A) or the limited-open configuration of FIG. 3C and adjust the graphic presentation accordingly. Note that no physical change is being made to the LCD 314 itself, but rather the modification is being made to the graphic image presented on it. It certainly be desirable in some cases to not use the LCD 314 when the mobile station 300 is in the closed configuration, and an automatic switch could be provided to turn on the appropriate portion of the display according to the open or limited-open configuration selected by the user.

Several variations of the dual-movement hinge mobile station described above are possible. As alluded to earlier, a spring may be used to bias the mobile station into either the limited-open or the closed position. A user would have to supply a force opposing the biasing force in order to operate the mobile station to this non-biased configuration. If the spring is used to bias the mobile station into a limited-open configuration, some form of releasabley catch is desirable that engages when the mobile station is closed. In that case a button or some other trigger may be provided to release the catch so that the user may view a number, make a call, and so forth. The hinge 350 will likely feature a stop mechanism (not shown) to ensure that the mobile station 300 cannot be longitudinally opened past a certain distance. For example, one or both ends of the hinge pin could form an extension that travels in a corresponding groove formed on the interior surface of a hinge sleeve, the groove being of limited length. To allow the hinge pin to rotate relative to the sleeve, instead of a groove the cylindrical opening formed in the hinge pin may simply widen for an appropriate portion of its length to accommodate the extension formed in the hinge pin, which would be unable to fit in the narrower portions of the hinge-sleeve opening.

It is not required that the hinge pin 351 be hidden when the mobile station 300 is in the closed position (of FIG. 3B), although it will often be desirable. And, a plurality of separate hinges may be used in place of the one shown in FIGS. 3A–3C.

The preferred descriptions are of preferred examples for implementing the invention, and the scope of the invention should not necessarily be limited by this description. The scope of the present invention is defined by the following claims.

What is claimed is:

1. A mobile station enclosure, comprising:
    a first enclosure section;
    a second enclosure section;
    a hinge for attaching the first enclosure section to the second enclosure section, the hinge comprising:
    a first sleeve fixedly attached to the first enclosure section and forming a longitudinal recess;
    a second sleeve fixedly attached to the second enclosure section and forming a longitudinal recess; and
    an elongate hinge pin, a first portion of the hinge pin being disposed within the longitudinal recess of the first sleeve and a second portion of the hinge pin being disposed within the longitudinal recess of the second sleeve, at least one of which said first portion of said hinge pin or said second portion of said hinge pin is configured to be longitudinally slidable within the respective longitudinal recess of said first sleeve or the longitudinal recess of said second sleeve; and
    wherein the first enclosure section and the second enclosure section may be moved relative to each other by longitudinally sliding along the hinge pin and by rotation about the hinge pin between a closed configuration and an open configuration.

2. The mobile station of claim 1, wherein the hinge pin is fixedly attached to the first sleeve.

3. The mobile station of claim 1, wherein the hinge pin is fixedly attached to the second sleeve.

4. The mobile station of claim 1, further comprising a display that is at least partially hidden from view when the mobile station is in a closed configuration.

5. The mobile station of claim 4, wherein at least a portion of the display that is hidden from view when the mobile station is in a closed configuration is revealed when the first enclosure section and the second enclosure section are moved relative to each other by longitudinally sliding along the hinge pin from a first position to a second position.

6. The mobile station of claim 5, further comprising a spring for biasing the first enclosure section and the second enclosure section into the first position.

7. The mobile station of claim 5, further comprising a spring for biasing the first enclosure section and the second enclosure section into the second position.

8. The mobile station of claim 7, further comprising a releasable catch for holding the first enclosure section and the second enclosure section in the first position until released, whereupon the biasing force of the spring moves the first enclosure section and the second enclosure section into the second position unless overcome by an externally applied force.

9. The mobile station of claim 1, further comprising a stop for limiting the longitudinal movement of the first enclosure section and the second enclosure section to a permissible range of movement.

10. The mobile station of claim 9, wherein the stop comprises an extension formed by the hinge pin, whereupon the permissible range of movement is defined in one direction by the configuration at which the extension comes into contact with a corresponding mobile station structure.

11. A mobile station enclosure, comprising:
    a first enclosure section;
    a second enclosure section;
    a hinge for attaching the first enclosure section to the second enclosure section, the hinge comprising:
    a first sleeve fixedly attached to the first enclosure section and forming a longitudinal recess;
    a second sleeve fixedly attached to the second enclosure section and forming a longitudinal recess; and
    an elongate hinge pin, a first portion of the hinge pin being longitudinally slidably disposed within the longitudinal recess of the first sleeve, and a second portion of the hinge pin being disposed within the longitudinal recess of the second sleeve; and
    wherein the first enclosure section and the second enclosure section may be moved relative to each other by longitudinally sliding along the hinge pin and by rotation about the hinge pin between a closed configuration and an open configuration.

12. The mobile station of claim 11, wherein the hinge pin is fixedly attached to the second sleeve.

13. The mobile station of claim 11, further comprising a display that is at least partially hidden from view when the mobile station is in a closed configuration.

14. The mobile station of claim 13, wherein at least a portion of the display that is hidden from view when the mobile station is in a closed configuration is revealed when the first enclosure section and the second enclosure section are moved relative to each other by longitudinally sliding along the hinge pin from a first position to a second position.

15. The mobile station of claim 14, further comprising a spring for biasing the first enclosure section and the second enclosure section into the first position.

16. The mobile station of claim 14, further comprising a spring for biasing the first enclosure section and the second enclosure section into the second position.

17. The mobile station of claim 16, further comprising a releasable catch for holding the first enclosure section and the second enclosure section in the first position until released, whereupon the biasing force of the spring moves the first enclosure section and the second enclosure section into the second position unless overcome by an externally applied force.

18. The mobile station of claim 11, further comprising a stop for limiting the longitudinal movement of the first enclosure section and the second enclosure section to a permissible range of movement.

19. The mobile station of claim 18, wherein the stop comprises an extension formed by the hinge pin, whereupon the permissible range of movement is defined in one direction by the configuration at which the extension comes into contact with a corresponding mobile station structure.

* * * * *